Figure 1:
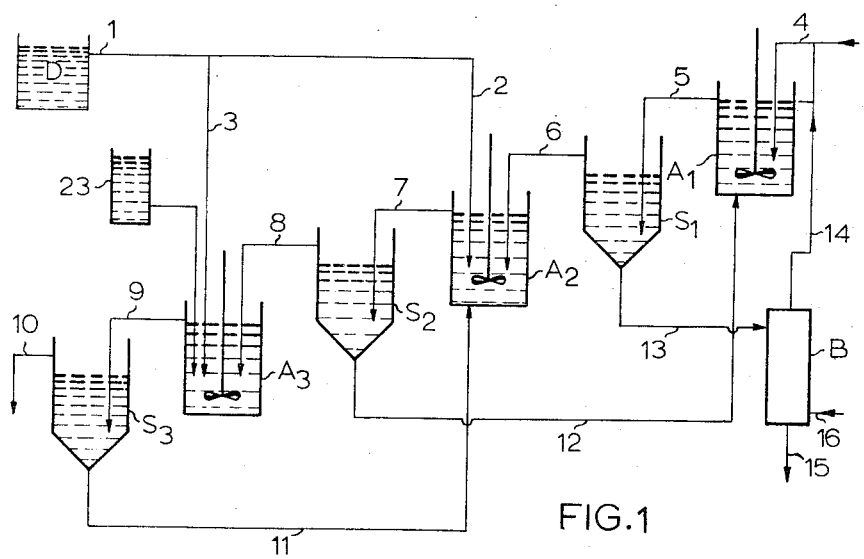

United States Patent Office 3,335,183
Patented Aug. 8, 1967

3,335,183
PREPARATION OF OXIMES
Abraham H. de Rooij, Geleen, Netherlands, assignor to Stamicarbon N.V., Heerlen, Netherlands
Filed Dec. 29, 1964, Ser. No. 421,815
Claims priority, application Netherlands, Dec. 30, 1963, 302,789
2 Claims. (Cl. 260—566)

The present invention relates to the preparation of oximes by reacting a solution containing hydroxylamine with an organic compound containing a carbonyl group. More particularly the invention relates to an oxime preparation process wherein the solution of hydroxylamine is obtained by reducing a solution containing a nitrite and a bisulfite with sulfur dioxide and thereafter hydrolyzing the resulting salt of hydroxylamine disulphonic acid.

The preparation of the solution of the hydroxylamine, preferably, comprises reacting a solution containing ammonium nitrite and ammonium bisulfite with sulfur dioxide, according to the reaction equation:

$$NH_4NO_2 + NH_4HSO_3 + SO_2 \rightarrow HON(SO_3NH_4)_2 \quad (1)$$

thus producing the ammonium salt of the hydroxylamine disulphonic acid. The pH of the salt solution is conveniently adjusted to a pH of about 2 preferably by the addition of an inorganic acid, such as sulfuric acid and thereafter heated in the presence of water to hydrolyze the salt according to the following equation:

$$HON(SO_3NH_4)_2 + H_2O \rightarrow$$
$$HONHSO_3NH_4 + NH_4HSO_4 \quad (2)$$

thus producing hydroxylamine monosulphonic ammonium salt and ammonium bisulfate. The hydroxylamine monosulphonic ammonium salt is further hydrolyzed according to the reaction equation:

$$HONHSO_3NH_4 + H_2O \rightarrow HONH_3 \cdot NH_4SO_4 \quad (3)$$

to produce hydroxylammonium-ammonium sulfate, the reaction product thus obtained being a solution of a mixture of ammonium bisulfate and hydroxylammonium-ammonium sulfate.

Heretofore, in the preparation of a solution containing hydroxylamine for use in the synthesis of oximes, the hydrolysis product of Equation 3 above was treated with $NH_3$ to neutralize the acid solution, thus converting the ammonium bisulfate to ammonium sulfate. Further, in prior art processes the hydroxylamine salt used in the oxime synthesis reaction liberated acid ammonium bisulfate which was converted to ammonium sulfate by introducing $NH_3$ into the reaction. Thus, according to the prior art teachings a total theoretical amount of two moles of $NH_3$ were consumed for each mole of hydroxylamine required in the oxime synthesis reaction, the $NH_3$ being utilized to convert ammonium bisulfate to ammonium sulfate. At one time the production of ammonium sulfate was convenient since it represented a commercially attractive by-product generally employed as a fertilizer. However, its production today is not commercially attractive and the prior art process which resulted in its production is also economically unattractive since it requires the use of relatively expensive synthetic $NH_3$.

It is, therefore, an object of the instant invention to provide a process for the production of oximes which overcomes the disadvantages of prior art methods.

Another object of the instant invention is to provide a process for the production of oximes from aliphatic, alicyclic as well as aromatic compounds with a carbonyl group, such as aldehyde or ketones in which, in addition to the oxime ammonium bisulfate is recovered.

It has now been found that these objects can be achieved by carrying out the oxime preparation, in accordance with the invention, substantially in a reaction mixture which, in addition to hydroxylammonium-ammonium sulfate, contains ammonium bisulfate, using such an amount of ammonium sulfate in the reaction mixture that, due to the buffering action of the combination of ammonium sulfate and ammonium bisulfate, the pH of the reaction mixture is maintained at about 1.5 to 3.0 throughout the oxime preparation. Subsequent to separating out the oxime, the remaining solution, which contains free ammonium bisulfate is discharged. To obtain a pH value of about 1.8 to 2.0 the molar ammonium sulfate: ammonium bisulfate ratio at the end of the oxime formation should be approximately 1:1.

The resulting oxime can be easily separated from the solution containing ammonium sulfate and ammonium bisulfate, since at a sufficiently high temperature it will float as a molten layer on the underlying aqueous solution. In order to complete the oxime formation in said aqueous solution in a following stage, the pH value can be raised in this stage by means of minor amounts of ammonia, whereby the rest of the aldehyde or the ketone are converted to oxime.

The aqueous solution discharge can be used as such, with utilization of the acid properties, but it has also been found advantageous first to crystallize ammonium sulfate from the solution by cooling, to separate it from the solution and then to recycle it to the oxime preparation process.

Figure 2:
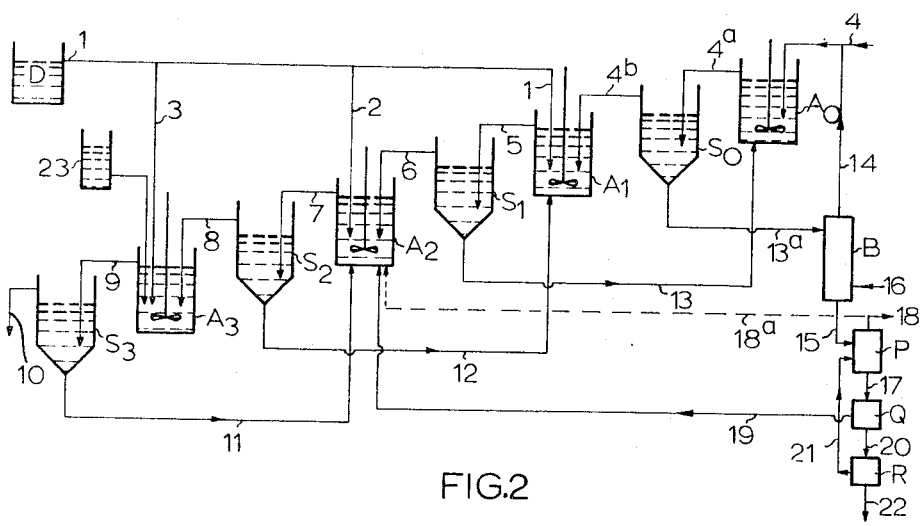

The oxime preparation according to the present invention will be further described with reference to the figures wherein:

FIGURE 1 schematically illustrates an oxime preparation starting from a neutralized solution of ammonium sulfate and hydroxylammonium sulfate, and FIGURE 2 schematically illustrates an oxime preparation process starting from an acid solution containing ammonium bisulfate and hydroxylammonium sulfate.

When use is made of a hydroxylammonium sulfate solution which has already been neutralized, it has been found advantageous to carry out the oxime reaction in two stages as illustrated in FIGURE 1, thus, avoiding essentially any by-production of ammonium sulfate. When use is made of a still acid hydroxylammonium sulfate solution, it has been found desirable to effect the oxime reaction in three stages, with rising pH value, as is shown in FIGURE 2.

Referring now to FIGURE 1, oxime is produced in two series-arranged reactors $A_2$ and $A_3$, each of which is associated with a separator, $S_2$ and $S_3$, respectively. In these separators the oxime which is formed in the reactors is separated as a top layer from the underlying aqueous layer. The extractor $A_1$, with its separator $S_1$, serves to free the aqueous layer, discharged from separator $S_2$ through conduit 12, of still dissolved oxime and hydroxylammonium salt by extraction, the extraction agent used being the aldehyde or ketone to be converted into oxime. The extracting agent is supplied to extractor $A_1$ through conduit 4. As an alternative embodiment, this extraction process can also be carried out in the two stages, using two series-arranged extraction vessels.

The mixture present in tank $A_1$ flows through conduit 5 into separator $S_1$ and there separates into two layers. The top layer of aldehyde or ketone is conducted via conduit 6 into oxime reactor $A_2$. To this reactor there is also introduced, through conduits 1 and 2, a solution of hydroxylammonium sulfate and ammonium sulfate, leading from the hydroxylamine synthesis reactor D. The temperature in reaction $A_2$ is sufficient to maintain the oxime formed therein fluid. Additionally, into reactor $A_2$ there is introduced, through conduit 11, the aqueous layer produced in separator $S_3$. This layer consists essentially of a solution of ammonium sulfate. The pH of the reaction mixture in reactor $A_2$ is between about 1.7–2.0. Through conduit 7 the reaction mixture of reactor $A_2$ is conducted into separator $S_2$. The reaction mixture separates into a top layer, containing oxime and a slight amount of non-converted aldehyde or ketone which, in turn, is conducted to oxime reactor $A_3$ through conduit 8. Into reactor $A_3$ there is also introduced a minor amount of hydroxylammonium sulfate via conduit 3. The pH of the reaction mixture in reactor $A_3$ is maintained at about 4.5 by the addition thereto of aqueous ammonium from tank 23.

Through conduit 9 the reaction mixture of reactor $A_3$ is conducted into separator $S_3$, where it separates into the two layers. The top layer consisting essentially of oxime is removed as product via conduit 10.

The aqueous layer formed in separator $S_1$ which comprises a solution of ammonium bisulfate and ammonium sulfate, flows through conduit 13 into stripping column B, wherein the still dissolved unreacted ketone or aldehyde is removed by means of steam supplied thereto through conduit 16. The recovered unreacted ketone or aldehyde is returned into conduit 4 via conduit 14. The acid solution of ammonium bisulfate and ammonium sulfate removed from stripping column B through conduit 15 is highly suited for the absorption of $NH_3$ from coke oven gas.

Referring now to FIGURE 2, the oxime reaction takes place in three series-arranged reactors $A_1$, $A_2$ and $A_3$. The oxime formed in each reactor is separated in the separators $S_1$, $S_2$ and $S_3$ associated with reactors $A_1$, $A_2$ and $A_3$, respectively, as a liquid top layer from the aqueous bottom layer.

The tank $A_0$ with its separator $S_0$ serves to extract still dissolved oxime and hydroxylamine salt from the aqueous layer discharged through conduit 13 from separator $S_1$. The organic compound containing a carbonyl group, i.e., an aldehyde or ketone to be converted into oxime is supplied to tank $A_0$ through conduit 4 as an extracting agent and is conducted to oxime reactor $A_1$ via tank $A_0$, conduit $4a$, separator $S_0$ and conduit $4b$.

Through conduit 1 there is introduced into reactor $A_1$ a solution of hydroxylammonium sulfate leading from hydroxylamine synthesis reactor D. The solution, additionally, contains ammonium bisulfate.

An aqueous layer containing ammonium bisulfate and ammonium sulfate, which is removed from the bottom of separator $S_2$, is conducted through conduit 12 to reactor $A_1$ to adjust the pH of the reaction mixture contained therein at about 1.4–1.8. The carbonyl group containing compound is introduced into reactor $A_1$ through conduit $4b$ and it can comprise, for instance, a stream of cyclohexanone. The reaction mixture characterized by a conversion efficiency of 85% to oxime flows through conduit 5 and into separator $S_1$. The top layer formed in separator $S_1$ which consists of molten oxime and some cyclohexanone, is conducted via conduit 6 into oxime reactor $A_2$, wherein oxime formation is continued after introduction therein of a small quantity of hydroxylammonium sulfate solution, via conduit 2, and of ammonium sulfate from separator Q, via conduit 19. The lower aqueous layer separated in separator $S_3$ is conducted via conduit 11 to reactor $A_2$. The total reaction mixture present in reactor $A_2$ has a pH value of about 2.8. The reaction product in reactor $A_2$ is subsequently introduced into separator $S_2$ via conduit 7 where it separates into a top and bottom layer. The top layer comprises molten oxime, containing a small amount of unreacted cyclohexanone. This top layer is introduced through conduit 8 into reactor $A_3$. Additionally, into reactor $A_3$ there is introduced, through conduit 3, hydroxylammonium sulfate and, from tank 23, ammonia water in an amount sufficient to adjust the pH of the reaction mixture in reactor $A_3$ to about 4.5. At this pH value the conversion to oxime is practically complete (efficiency 99.99%). After termination of the reaction the reaction product is introduced into separator $S_3$ through conduit 9 wherein it again separates into a top layer and a bottom layer. The top layer comprises molten oxime which is discharged as product through conduit 10. The bottom layer comprises an aqueous solution of ammonium sulfate which is recycled through conduit 11 to the preceding oxime reactor $A_2$. The bottom aqueous layer formed in separator $S_1$, which, unlike the aqueous solutions discharged from the bottoms of separators $S_2$ and $S_3$, contains, in addition to ammonium sulfate and ammonium bisulfate, some dissolved oxime and hydroxylammonium salt, due to the lower pH of the mixture contained in separator $S_1$. The bottom aqueous layer of separator $S_1$ is conducted through conduit 13 to tank $A_0$, where it is extracted with a supply of an extractant, for instance, cyclohexanone. Subsequently, it is then separated from the cyclohexanone is separator $S_0$. The bottom aqueous solution of separator $S_0$ passes through conduit $13a$ into stripping column B, where dissolved cyclohexanone is stripped off by means of steam supplied thereto through conduit 16. This extractant, i.e., cyclohexanone is then returned to extractant supply line 4 through conduit 14 while the solution discharged from stripping column B is passed into evaporator P through conduit 15.

Evaporated water from evaporator P escapes through conduit 18. A suspension of ammonium sulfate crystals, in a concentrated solution, formed in evaporator P is conducted to separator Q through conduit 17. Here, the crystal mass is separated out and is introduced into reactor $A_2$ through conduit 19. Through conduit 20 the mother liquor is conducted to crystallizer R where a mixture of ammonium sulfate and ammonium bisulfate is separated out and is recycled to evaporator P through conduit 21. The mother liquor in crystallizer R is discharged therefrom through conduit 22 and can be advantageously employed, for instance, in the decomposition of phosphate rock, or for the absorption of $NH_3$ from coke oven gas.

It is also possible to continue the evaporation of the solution in evaporator P and to use the resulting ammonium bisulfate in the rearrangement of oxime to lactam.

EXAMPLE 1

In a process for the preparation of oxime carried out in accordance with the schematic illustration shown in FIGURE 1, reactor $A_2$, wherein the first stage of the oxime preparation occurs, is provided through conduit 6, with a solution containing:

| | Moles |
|---|---|
| Cyclohexanone | 78 |
| Oxime | 24.6 |
| $NH_4HSO_4$ | 1.6 |
| $H_2O$ | 20 |

Through conduit 2 there is also introduced into reactor $A_2$ a solution leading from the hydroxylamine synthesis reactor D, said solution consisting of:

| | Moles |
|---|---|
| $NH_3OH \cdot NH_4SO_4$ | 87 |
| $(NH_4)_2SO_4$ | 108.3 |
| $NH_4NO_3$ | 11.31 |
| $NH_3$ | 7.4 |
| $H_2O$ | 1814 |

Additionally, via conduit 11, there is also introduced into reactor $A_2$ a solution consisting of:

| | Moles |
|---|---|
| $(NH_4)_2SO_4$ | 28.8 |
| $NH_3OH \cdot NH_4SO_4$ | 2 |
| $NH_4NO_3$ | 1.69 |
| $H_2O$ | 335 |

The pH of the mixture in reactor $A_2$ is about 2.2–2.3. The reaction product formed in reactor $A_2$ is conducted through conduit 7 to separator $S_2$, wherein a top layer and a bottom layer are formed. The top layer comprises, mainly, oxime and is passed into reactor $A_3$ through conduit 8. The composition of the oxime layer is:

| | Moles |
|---|---|
| Unreacted cyclohexanone | 11 |
| Oxime | 89.1 |
| $NH_4HSO_4$ | 1.6 |
| $H_2O$ | 35 |

Additionally, into reactor $A_3$ there is introduced via conduit 3, a hydroxylamine solution consisting of:

| | Moles |
|---|---|
| $NH_3OH \cdot NH_4SO_4$ | 13 |
| $(NH_4)_2SO_4$ | 16.2 |
| $NH_4NO_3$ | 1.69 |
| $NH_3$ | 1.1 |
| $H_2O$ | 271 |

Moreover, from reservoir 23, ammonia water in an amount of 11.5 moles of $NH_3$ and 45 moles of $H_2O$ are conducted to reactor $A_3$.

The pH of the reaction mixture in reactor $A_3$ is about 4.3–4.5. The reaction product of reactor $A_3$ is sent to the separator $S_3$ via conduit 9 where it again separates into a top layer and a bottom layer. The top layer consists essentially of:

| | Moles |
|---|---|
| Oxime | 99.99 |
| Cyclohexanone | 0.01 |
| $H_2O$ | 27 | and is discharged through conduit 10 as product.

The bottom water layer formed in separator $S_3$ is passed into reactor $A_2$ through conduit 11.

The bottom water layer formed in separator $S_2$ consists essentially of:

| | Moles |
|---|---|
| $NH_3OH \cdot NH_4SO_4$ | 22 |
| $(NH_4)_2SO_4$ | 144.5 |
| $NH_4HSO_4$ | 59.6 |
| $NH_4 \cdot NO_3$ | 13 |
| Oxime | 2.6 |
| $H_2O$ | 2201 | and is sent through conduit 12 into extraction vessel $A_1$. There it is mixed with 100.2 moles of cyclohexanone supplied through conduit 4. The mixture is then sent to separator $S_1$ where it forms two layers, a top and bottom layer, the top layer consisting mainly of cyclohexanone, together with a minor amount of oxime. This top layer is then passed into reactor $A_2$ through conduit 6. The bottom aqueous solution formed in separator $S_1$ is sent to stripping column B through conduit 13.

A stream of cyclohexanone stripped off (0.2 mole + 1 mole of $H_2O$) is returned into conduit 4 through conduit 14. Through conduit 15 a final solution consisting of:

| | Moles |
|---|---|
| $NH_4HSO_4$ | 80 |
| $(NH_4)_2SO_4$ | 144.5 |
| $NH_4NO_3$ | 13 |
| $H_2O$ | 2203 | is removed from stripping column B.

The process is carried out in the aforementioned manner produces only 20 moles of ammonium sulfate per 100 moles of hydroxylammonium sulfate, while the free acid content of 80 moles of ammonium bisulfate remains available for further application.

EXAMPLE 2

In a process for the preparation of oxime carried out in accordance with the schematic illustration shown in FIGURE 2, reactor $A_1$ is provided with, through conduit 4b, a solution consisting of:

| | Moles |
|---|---|
| Cyclohexanone | 78 |
| Oxime | 26 |
| $NH_4HSO_4$ | 1.6 |
| $H_2O$ | 20 |

Through conduit 1 there is also introduced into reactor $A_1$ a solution leading from the hydroxylamine synthesis reactor D, said solution consisting of:

| | Moles |
|---|---|
| $NH_3OH.NH_4SO_4$ | 70 |
| $NH_4HSO_4$ | 85.4 |
| $(NH_4)_2SO_4$ | 1.4 |
| $NH_4NO_3$ | 9.10 |
| $H_2O$ | 847 |

Additionally, via conduit 12 there is also introduced into reactor $A_1$ a solution consisting of:

| | Moles |
|---|---|
| $NH_3OH.NH_4SO_4$ | 10 |
| $NH_4HSO_4$ | 39.44 |
| $(NH_4)_2SO_4$ | 198.95 |
| $NH_4NO_3$ | 3.90 |
| $H_2O$ | 1435 |

The pH of the reaction mixture in reactor $A_1$ is about 1.6. The reaction product formed in reactor $A_1$ is conducted through conduit 5 into separator $S_1$ wherein it separates into two layers. The top layer consists mainly of oxime and has the following composition:

| | Moles |
|---|---|
| Oxime | 81.35 |
| Cyclohexanone | 20 |
| $NH_4HSO_4$ | 1.2 |
| $H_2O$ | 14 |

This top layer is sent to reactor $A_2$ through conduit 6.

Reactor $A_2$ is also provided through conduit 2 with a hydroxylamine solution consisting of:

| | Moles |
|---|---|
| $NH_3OH.NH_4SO_4$ | 22 |
| $NH_4HSO_4$ | 26.84 |
| $(NH_4)_2SO_4$ | 0.44 |
| $NH_4NO_3$ | 2.86 |
| $H_2O$ | 266.2 |

Moreover, via conduit 11, the bottom aqueous layer from separator $S_3$ consists of:

| | Moles |
|---|---|
| $NH_3OH.NH_4SO_4$ | 1.01 |
| $(NH_4)_2SO_4$ | 18.51 |
| $NH_4NO_3$ | 1.04 |
| Oxime | 0.05 |
| $H_2O$ | 181.8 | is introduced into reactor $A_2$. Also, there is introduced into reactor $A_2$ through conduit 19, a suspension of ammonium sulfate crystals leading from crystallizer Q (180 moles of $(NH_4)_2SO_4$, 101 moles of $H_2O$), while through conduit 18a, 900 moles of $H_2O$ are passed to this reactor.

The pH of the reaction mixture in reactor $A_2$ is about 2.4. The reaction product formed in reactor $A_2$ is led via conduit 7 to separator $S_2$ where it separates into two layers. From separator $S_2$ the oxime-containing top layer flows to reactor $A_3$ through conduit 8. The composition of this oxime layer is:

| | Moles |
|---|---|
| Oxime | 93.05 |
| Cyclohexanone | 7 |
| $NH_4HSO_4$ | 1.6 |
| $H_2O$ | 35 |

Reactor $A_3$ also is provided through conduit 3, with a hydroxylamine solution consisting of:

| | Moles |
|---|---|
| $NH_3OH \cdot NH_4SO_4$ | 8 |
| $NH_4HSO_4$ | 9.76 |
| $(NH_4)_2SO_4$ | 0.16 |
| $NH_4NO_3$ | 1.04 |
| $H_2O$ | 96.8 | and, from tank 23, ammonia water (18.35 moles of $NH_3$, 70 moles of $H_2O$). The pH of the reaction mixture in reactor $A_3$ is, accordingly, adjusted to about 4.4. Through conduit 9 the reaction product formed in reactor $A_3$ is passed into separator $S_3$ where, again, it separates into two layers. The top layer of oxime formed here, the composition of which is:

| | Moles |
|---|---|
| Oxime | 99.99 |
| Cyclohexanone | 0.01 |
| $H_2O$ | 27 | is discharged through conduit 10 as product.

Through conduit 11 the bottom aqueous layer of separator $S_3$ is fed into the preceding oxime reactor $A_3$. The bottom aqueous layer formed in separator $S_1$ has the following composition:

| | Moles |
|---|---|
| $NH_4OH \cdot NH_4SO_4$ | 22 |
| $NH_4HSO_4$ | 184.44 |
| $(NH_4)_2SO_4$ | 200.35 |
| $NH_4NO_3$ | 13.0 |
| Oxime | 4 |
| $H_2O$ | 2346 | and is passed through conduit 13 into the mixing vessel $A_0$. There it is treated with cyclohexanone (100.2 moles) supplied through conduit 4. The mixture in vessel $A_0$ is then introduced through conduit 4a into separator $S_0$, from where the top layer consisting mainly of cyclohexanone is fed into reactor $A_1$ through conduit 4b.

The bottom aqueous layer of separator $S_0$ which is freed of hydroxylamine and oxime is passed through conduit 13a into stripping column B, where 0.2 mole of cyclohexanone and 1 mole of $H_2O$ are stripped off by means of steam supplied through conduit 16. Thereafter the cyclohexanone and water are recycled to conduit 4 through conduit 14.

Through conduit 15 the solution from stripping column B, containing essentially ammonium sulfate and ammonium bisulfate, is passed into evaporator P. Part of the resulting evaporated water (900 moles) passed through conduit 18a to reactor $A_2$, the remainder 872 moles) being discharged through conduit 18.

The crystal suspension formed in evaporator P is conducted to separator Q. While the mass of crystals separated off (180 moles of $(NH_4)_2SO_4$, 101 moles of $H_2O$) is passed through conduit 19 to reactor $A_2$. The resulting mother liquor is subjected to further cooling in crystallizer R, where a compound consisting of ammonium sulfate and ammonium bisulfate is separated out (150 moles of $NH_4HSO_4$, 150 moles of $(NH_4)_2SO_4$, 95 moles of $H_2O$). This mass is returned into evaporator P through conduit 21.

Through conduit 22 a solution consisting of:

| | Moles |
|---|---|
| $NH_4HSO_4$ | 200.84 |
| $(NH_4)_2SO_4$ | 20.35 |
| $NH_4NO_3$ | 13.0 |
| $H_2O$ | 57.5 | is discharged.

Thus, the process, when carried out in the aforementioned manner makes available for other applications the acid content of 200 moles of $NH_4HSO_4$ per 100 moles of oxime produced, which means a considerable saving in the consumption of $NH_3$.

What is claimed is:

1. A process for the preparation of an oxime comprising:
   (1) reducing a solution containing ammonium nitrite and a bisulfite with sulfur dioxide to provide a reduction product comprising a solution of ammonium bisulfate and hydroxyl ammonium sulfate;
   (2) reacting said reduction product in the presence of ammonium sulfate with cyclohexanone to produce an oxime and an aqueous solution containing a major amount of ammonium sulfate and ammonium bisulfate and a minor amount of unreacted hydroxylammonium sulfate, the molar ratio of ammonium sulfate to ammonium bisulfate being sufficient to maintain the pH of said reaction between 1 and 2.2;
   (3) substantially separating said oxime from said aqueous solution;
   (4) extracting said aqueous solution from step (3) with cyclohexanone to recover said minor amount of unreacted hydroxyl ammonium sulfate; and
   (5) discharging the remainder of said aqueous solution containing ammonium sulfate and ammonium bisulfate.

2. A process for the preparation of an oxime comprising:
   (1) reducing a solution containing ammonium nitrite and ammonium bisulfite with sulfur dioxide to provide a reduction product comprising a solution of hydroxylammonium sulfate and ammonium bisulfate;
   (2) reacting said reduction product in the presence of ammonium sulfate with cyclohexanone in a cyclic flow process comprising series-connected stages;
   (3) maintaining the pH of the reaction mixture in the first reaction stage at a pH of 1–2 by the buffering action of ammonium sulfate and ammonium bisulfate present therein;
   (4) substantially separating a first resulting oxime solution containing unreacted cyclohexanone from an aqueous solution containing a major amount of ammonium sulfate and ammonium bisulfate and a minor amount of oxime and unreacted hydroxylammonium sulfate in said first reaction stage;
   (5) conducting said first resulting oxime solution to a final reaction stage;
   (6) maintaining the pH of the reaction mixture in said final reaction stage at a pH of 4–5 by the addition thereto of a neutralizing agent;
   (7) substantially separating a final resulting oxime product from an aqueous ammonium sulfate solution in said final reaction stage;
   (8) recycling the substantially oxime-free aqueous ammonium sulfate solution from said final reaction stage to a preceding reaction stage;
   (9) withdrawing from said first reaction stage said aqueous solution;
   (10) extracting said equeous solution from step (9) with cyclohexanone to recover said minor amount of oxime and unreacted hydroxylammonium sulfate; and

(11) introducing said minor amount of oxime and unreacted hydroxylammonium sulfate recovered in step (10) into said first reaction stage.

References Cited

UNITED STATES PATENTS

| 2,820,825 | 1/1958 | Hillyer et al. | 260—566 |
| 3,070,627 | 12/1962 | Bostian et al. | 260—566 |

FOREIGN PATENTS

| 545,359 | 8/1957 | Canada. |
| 677,386 | 8/1952 | Great Britain. |

CHARLES B. PARKER, *Primary Examiner.*

F. D. HIGEL, R. HINES, *Assistant Examiners.*